US012311568B2

(12) United States Patent
Enderle et al.

(10) Patent No.: US 12,311,568 B2
(45) Date of Patent: May 27, 2025

(54) METHOD FOR THE PARALLEL PRODUCTION OF SHINGLED PORTIONS WITH DIFFERENT NUMBER OF SLICES AND SUITABLE SLICING MACHINE

(71) Applicant: MULTIVAC SEPP HAGGENMÜLLER SE & CO. KG, Wolfertschwenden (DE)

(72) Inventors: Tobias Enderle, Bad Grönenbach (DE); Albert Hartmann, Dietmannsried (DE)

(73) Assignee: MULTIVAC Sepp Haggenmüller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 18/627,170

(22) Filed: Apr. 4, 2024

(65) Prior Publication Data

US 2024/0335970 A1 Oct. 10, 2024

(30) Foreign Application Priority Data

Apr. 5, 2023 (DE) ......................... 102023108714.2

(51) Int. Cl.

| | |
|---|---|
| ***B65B 25/06*** | (2006.01) |
| ***B26D 5/00*** | (2006.01) |
| ***B26D 7/06*** | (2006.01) |
| ***B26D 7/32*** | (2006.01) |
| ***B65B 35/50*** | (2006.01) |
| *B26D 7/01* | (2006.01) |

(52) U.S. Cl.

CPC ................. *B26D 7/32* (2013.01); *B26D 5/00* (2013.01); *B26D 7/0683* (2013.01); *B65B 25/065* (2013.01); *B65B 25/068* (2013.01); *B65B 35/50* (2013.01); *B26D 2007/011* (2013.01); *B26D 2007/013* (2013.01); *B26D 2210/02* (2013.01)

(58) Field of Classification Search

CPC ............ B26D 2210/00; B26D 2210/02; B26D 2210/04; B65B 25/06; B65B 25/065; B65B 25/068

See application file for complete search history.

(56) References Cited

U.S. PATENT DOCUMENTS

| | | | | |
|---|---|---|---|---|
| 4,852,441 A * | 8/1989 | Anders | B26D 7/34 | 99/534 |
| 6,052,969 A * | 4/2000 | Hart | B65B 35/52 | 53/247 |
| 7,500,550 B2 * | 3/2009 | Strong | G06T 7/0006 | 198/459.8 |
| 9,878,462 B2 * | 1/2018 | Hörberg | B26D 7/325 | |

(Continued)

FOREIGN PATENT DOCUMENTS

EP 2942165 A2 11/2015

*Primary Examiner* — Gloria R Weeks
(74) *Attorney, Agent, or Firm* — Brooks Kushman P.C.

(57) ABSTRACT

In order to prevent a slice from being separated from each log during the last cut in the case of multiple portions produced in parallel, that is to say there is no unproductive cut in the last cut, as is required, for example, in EP 2942165 B1, the basic idea is to already provide an unproductive cut for at least one log during the first cut for the simultaneously produced portions, wherein a distinction must be made in the following procedure whether or not separately controllable portioning belts are present per lane and whether the portion lengths should be the same or not despite different numbers of slices.

15 Claims, 12 Drawing Sheets

(56) References Cited

U.S. PATENT DOCUMENTS

| | | | | |
|---|---|---|---|---|
| 9,981,400 | B2 * | 5/2018 | Dreier | B65B 25/08 |
| 11,064,705 | B2 * | 7/2021 | Van Blokland | B65G 47/68 |
| 11,198,565 | B2 * | 12/2021 | Fox | B26D 7/32 |
| 11,649,118 | B2 * | 5/2023 | Sleegers | B65B 35/44<br>198/781.06 |
| 11,807,409 | B1 * | 11/2023 | May | B65B 39/007 |
| 2007/0089967 | A1 * | 4/2007 | Pryor | A21C 9/085<br>198/331 |
| 2013/0205960 | A1 | 8/2013 | Schmeiser | |
| 2020/0399003 | A1 * | 12/2020 | Martin | B65B 5/04 |
| 2024/0066740 | A1 * | 2/2024 | Bialy | B65G 45/10 |
| 2024/0165844 | A1 * | 5/2024 | Bialy | B26D 5/00 |
| 2024/0198555 | A1 * | 6/2024 | Thalmeier | B26D 7/0683 |
| 2024/0308099 | A1 * | 9/2024 | Bialy | B26D 5/007 |

* cited by examiner

METHOD FOR THE PARALLEL PRODUCTION OF SHINGLED PORTIONS WITH DIFFERENT NUMBER OF SLICES AND SUITABLE SLICING MACHINE

CROSS-REFERENCE TO RELATED APPLICATIONS

This application claims foreign priority benefits under 35 U.S.C. § 119 (a)-(d) to German patent application number DE 102023108714.2, filed Apr. 5, 2023, which is incorporated by reference in its entirety.

TECHNICAL FIELD

The disclosure relates to a method for the parallel production of shingled portions with different numbers of slices by means of a multi-lane slicing machines, in particular a so-called slicer, with which strands of an only slightly compressible product such as sausage or cheese are cut into slices in the food industry.

BACKGROUND

Since these strands can be produced with a cross-section that retains its shape and dimensions well over its length, i.e. substantially constant, they are called product logs.

In this process, several product logs arranged parallel to one another are sliced simultaneously by slicing off one slice in each pass from the product logs arranged next to one another on the individual lanes using the same blade, which moves in a transverse direction to the longitudinal direction of the product logs.

The product logs are pushed forwards by a feed conveyor of a feeding unit in the direction of the blade of the slicing unit, usually on an obliquely downwardly directed feed conveyor, and guided in each case through the product openings of a plate-shaped slicing frame, at the front end of which the part of the product log projecting beyond it is cut off as a slice by the blade directly in front of the slicing frame.

During slicing, the product logs are usually held by a gripper at their rear end facing away from the slicing frame, which gripper is provided with corresponding gripper claws for this purpose.

To reload the slicer with new product logs, the feed conveyor can usually be folded down from the oblique slicing position into a horizontal loading position for easier loading.

This can already take place while the remainder of the product log is being sliced to the end—held by the grippers.

After this has taken place, the remaining piece that can no longer be sliced is removed from the grippers, the grippers move away from the slicing unit into their starting position at a maximum distance therefrom so that when the newly loaded feed conveyor is then pivoted upward, the grippers are again located behind the rear ends of the new product log and can grip them.

The separated slices fall onto a portioning belt of a discharge unit, by means of the defined step-by-step drive conveyor direction of which a portion is formed on each lane between the impact of the successive slices and then the portions are transported away for further processing.

If the machine is to have sufficient flexibility, both the feeding unit, in particular its upper and lower driven product guide, directly upstream of the slicing unit, and the portioning belts can be controlled individually for each lane.

If portions having different numbers of slices are to be produced on the individual lanes, for example because these multiple portions produced next to one another are then to be deposited together in a common packaging, this is achieved in that a slice is not separated from each log during each revolution of the blade, but a so-called unproductive cut is carried out in the case of one or more logs, in that this log is not pushed forwards beyond the blade plane before the impact of the blade. In this case, the gripper holding this log at the rear end generally remains in its longitudinal position.

Due to expansion or other influences, the front end of this log can nevertheless protrude somewhat into the blade plane, such that no entire slice but only a small shred of the product is separated from this log and lands on the portioning belt and is visually not attractive and should therefore be avoided, especially in the last slice of a portion, which is completely visible in the package.

It is already known from EP 2942165 A1 not to use an unproductive cut in the last cut for the multiple portions located next to one another, that is to say to separate a slice in the last cut from each log in order to prevent this formation of shreds.

However, this entails other disadvantages, such as difficulties when achieving a matching length of the portions and their arrangement in a packaging.

SUMMARY

It is therefore an object according to the disclosure to provide a method for simultaneously producing portions with an unequal number of slices on a slicing machine, in particular a slicer, that solves this problem, and a corresponding slicing machine.

With regard to the method for the parallel and substantially simultaneous creation of shingled portions with different numbers of slices made of slices, which are produced by means of the same, usually rotating blade from food logs fed in parallel next to each other in a multi-lane slicing machine, it is often the procedure that, during the slicing of the portions to be produced in parallel,

- a slice is separated from each of the logs fed in parallel and individually per lane during at least one, usually multiple, the revolutions of the blade required for this purpose
- in particular the portioning belts onto which the separated slices fall are controlled such that the length of the portions produced in parallel next to one another is always approximately the same independently of the number of slices per portion.

On account of the different numbers of slices in the portions, one or more unproductive cuts are carried out in the portions having a smaller number of slices, i.e. no slice is separated from this log when the blade passes through.

These unproductive cuts are often deposited in the middle of the portion, but a slice is separated in each case from each of the logs during the first and last cut for the portions.

This improves the visual appearance of the first and last slice of each portion by avoiding the formation of shreds, but limits the variability of the remaining method greatly.

According to the disclosure, it is proposed, in the first cut for this group of portions to be created in parallel, not to separate a slice from at least one of the logs to be sliced simultaneously, i.e. to provide an unproductive cut already for one log.

Whether or not the corresponding portioning belt is moved forwards after this first cut, like the portioning belts on which a first slice has been deposited, can be handled freely. Regardless of this, on the portioning belt on which no slice was deposited during the first cut, the portion is started further to the rear than on the portioning belts on which a slice was already deposited during the first cut.

This procedure results in a high variability of the rest of the method for the parallel creation of portions, in particular from the perspective of whether or not an unproductive cut is carried out in the last cut for this group of logs in one of the logs.

Preferably, in the last cut for the group of portions, an unproductive cut is carried out, i.e. a slice is not separated from all logs.

Of course, it has to be distinguished whether a portioning belt is present in each lane, which portioning belt can be operated separately and independently of the others with regard to its movement (lane-individual portioning belt), or only one common drive is present across all lanes, either across all separate portioning belts or from the outset only a single wide portioning belt present across all lanes, i.e. across the entire lane region, is present.

In the case of lane-individual portioning belts, the slice distance within one portion can be selected differently from lane to lane in such a way that, despite an uneven number of slices, the portion length is the same in all portions, i.e. on all lanes.

This results in a matching visual appearance.

Above all, in the cuts between the first and the last cut, one slice can then be separated in each case without requiring further unproductive cuts, especially if the number of slices within the portions only differs by one slice.

Preferably, those logs in which no slice has been separated during the first cut are thus of the same type, in particular the same consistency, i.e. for example, sausage or cheese or the same type within this category and/or these logs have the same cross-sectional dimensions, at least the same height.

The same applies to those logs in which no slice is sliced off during the last cut for a portion.

If, in contrast, there is one or more portioning belts with only one common drive, the slice distances between two successive slices must be selected to be equal within all parallel portions, unless (preferably in the middle region of the portion) an unproductive cut is carried out at one log in order nevertheless to achieve the same portion length despite different numbers of slices.

However, in the case of a common portioning belt drive, slicing is preferably done in such a way that, in the last cut for a portion, no slice is separated from at least one log.

This increases the variability of the method.

If multiple portions are to be combined into one package downstream of the portioning belt, in other words, are to be introduced into the packaging spaced apart or partially overlapping in the transverse direction, the front and/or rear ends of the portions are preferably brought into the same longitudinal position in the packaging before or while they are being combined.

Preferably, after the penultimate cut for the portions created next to one another, only the portioning belts of those lanes on which a last slice must still be deposited for this portion are moved forwards.

Portions which end at the same longitudinal position are thus created.

During combining or already beforehand (i.e. for example by means of the inserter itself or by means of an upstream compensation belt) the relative position of the portions relative to one another with respect to the longitudinal direction can either be left as they were supplied and, in particular, supplied from the discharge unit of the slicing machine, or (with a different portion length) can also be brought to a lower starting and/or end distance from one another in the longitudinal direction than the original starting or end distance, from which only a starting distance or only an end distance was generally present during the creation of the portions.

This one distance is often distributed to a half of the initial distance and end distance during the depositing in the packaging.

BRIEF DESCRIPTION OF THE DRAWINGS

Embodiments in accordance with the disclosure are described in more detail below by way of example, with reference to the following figures.

DETAILED DESCRIPTION

Figure 1A:
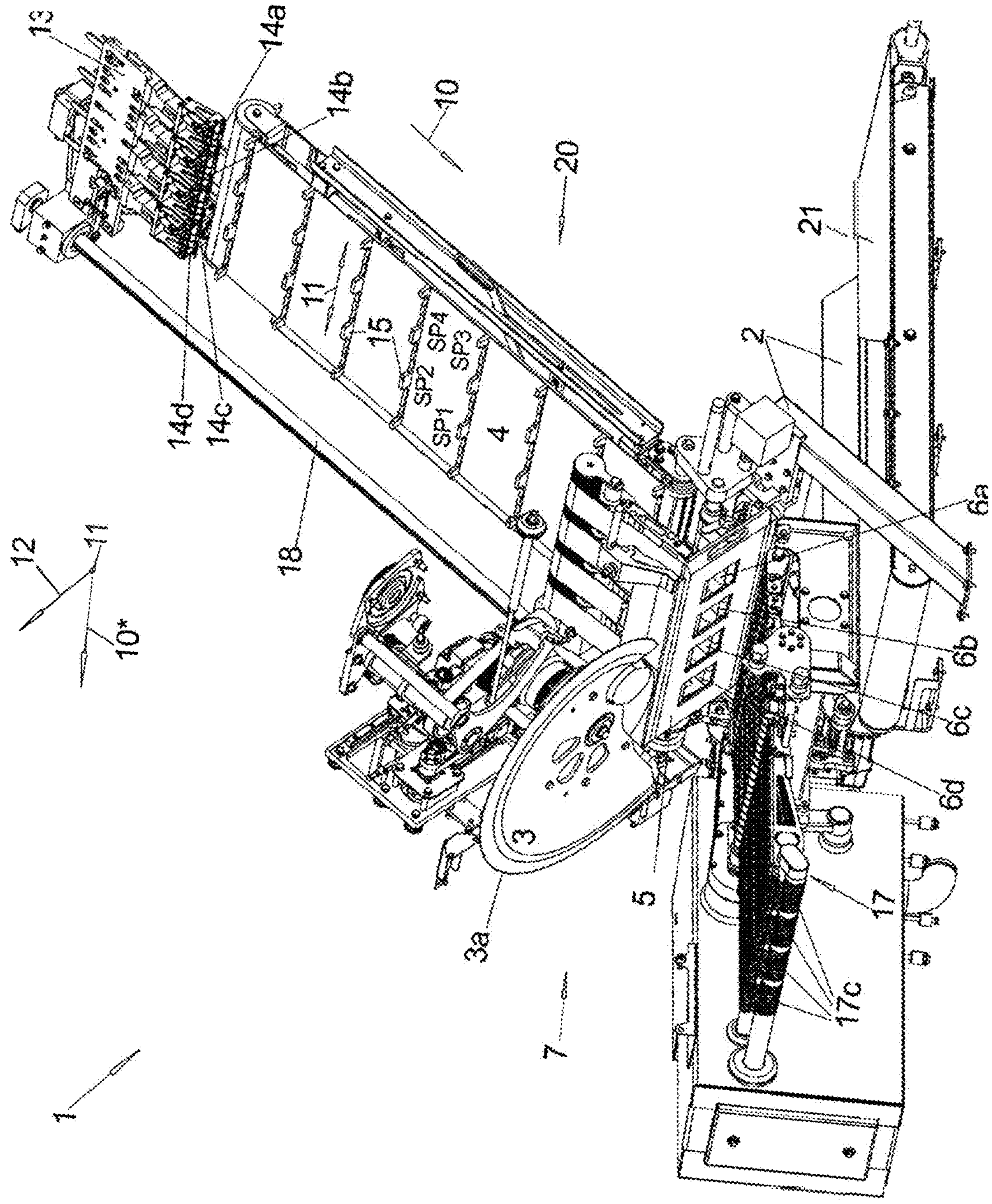
FIGS. 1A, B: show a slicing machine in the form of a slicer in accordance with the prior art in different perspective views, with feed belt swung up into the slicing position.
Figure 1B:
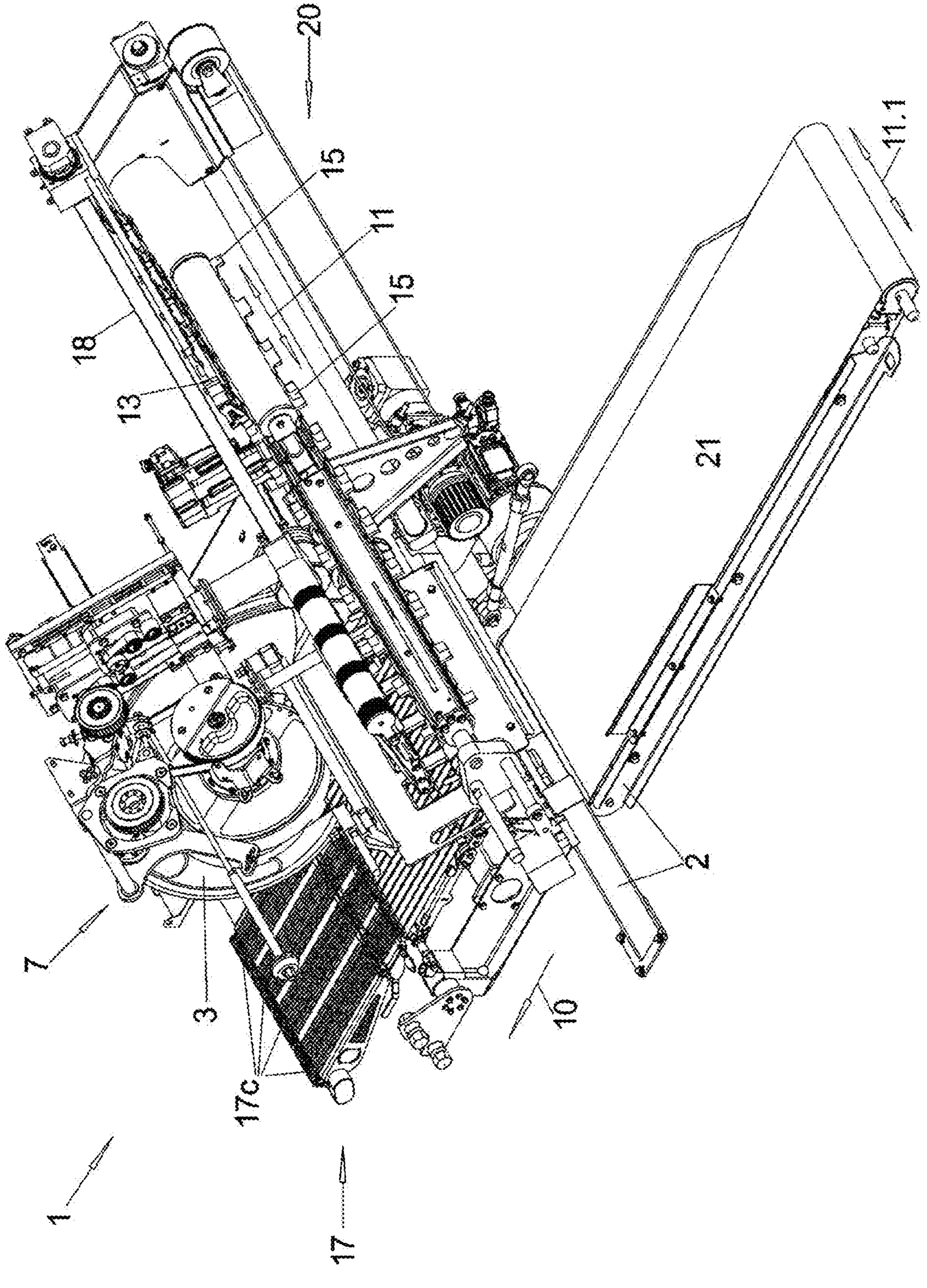

FIG. 1A, 1B are different perspective views of a multi-lane slicer 1 for simultaneously slicing a plurality of product logs K in a respective lanes SP1 to SP4 next to each other and depositing them in shingled portions P each consisting of several slices S with a general direction of travel 10* through the slicer 1 from right to left.

Figure 2A:
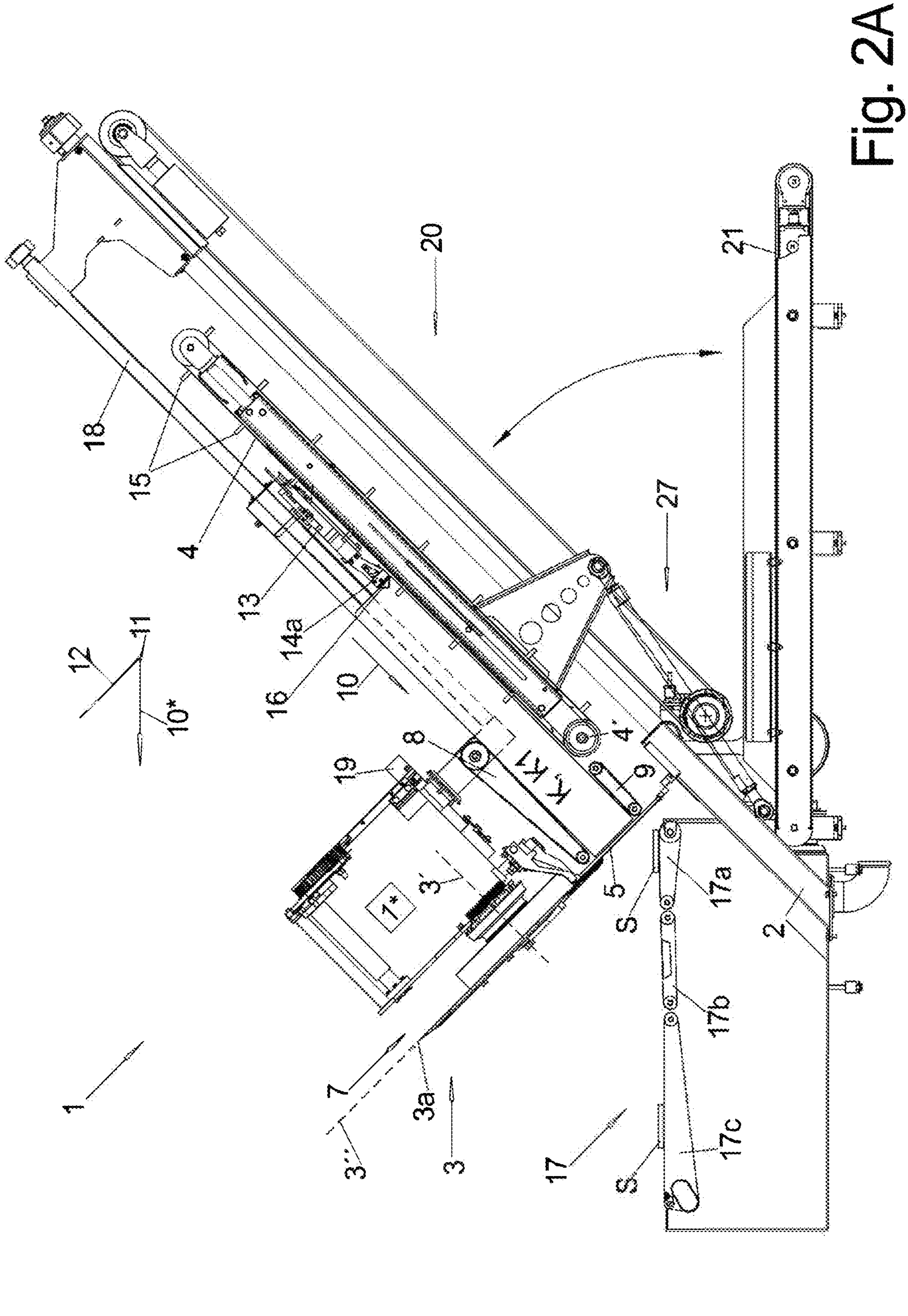
FIG. 2A: is a side view of the slicing machine that is simplified and freed from panel parts, so that the individual conveyor belts can be seen more clearly, loaded with a product log.

FIG. 2A is (with the log K inserted) a side view of this slicer 1, omitting covers and other parts not relevant to the disclosure, which are fastened to the base framework 2 in the same manner as all other units, so that the functional parts, especially the conveyor belts, can be seen more clearly. The longitudinal direction 10 is the feed direction of the logs K to the slicing unit 7 and thus also the longitudinal direction of the logs K lying in the slicer 1.

It can be seen that the basic structure of a slicer 1 according to the prior art is that a slicing unit 7 with a blade 3 rotating about a blade axis 3', in this case a sickle blade 3, is fed with multiple, in this case four, product logs K lying transversely to the feed direction 10 next to one another on a feed conveyor 4 with spacers 15 of the feed conveyor 4 between them by this feeding unit 20, from the front ends of said logs the rotating blade 3 cuts off a slice S with its slicing edge 3*a* in each case in one operation, that is to say almost simultaneously.

Figure 2B:
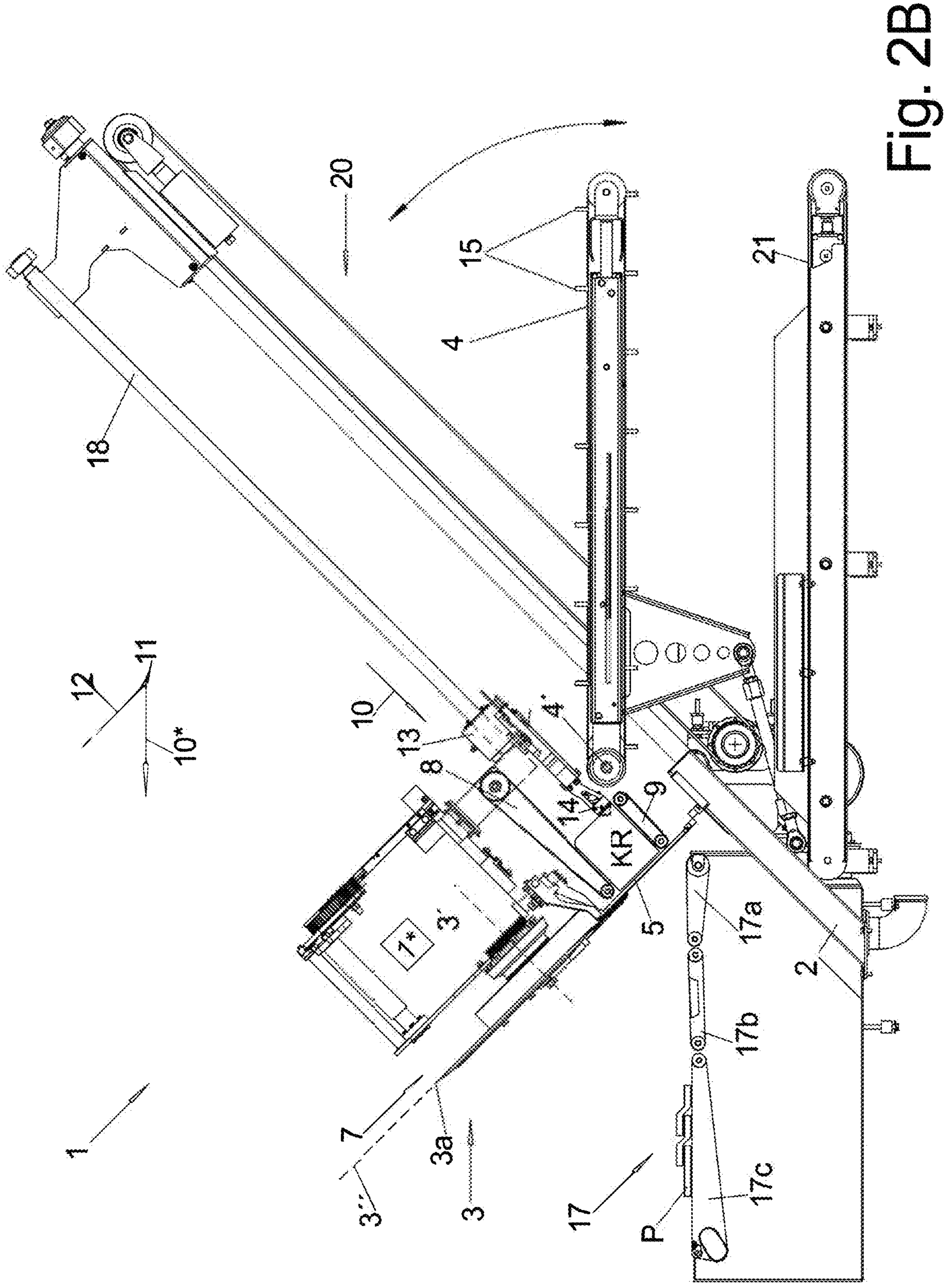
FIG. 2B: is a side view in accordance with FIG. 2A, but with the feed belt swung down into the loading position and the product log sliced except for a log remnant.

For slicing the product logs K, the feed conveyor 4 is in the slicing position shown in FIGS. 1A-2A and is oblique in side view, with a low-lying front end on the slicing side and a high-lying rear end, from which it can be folded down about a pivot axis 4' extending in its width direction, the first transverse direction 11, which is located in the vicinity of the slicing unit 7, into an approximately horizontal loading position as represented in FIG. 2B.

The rear end of each log K lying in the feeding unit 20 is held in accordance with FIG. 2A in each case by a gripper 14*a-d* by positive locking with the aid of gripper claws 16. These grippers 14*a*-14*d*, which can be activated and deactivated with regard to the position of the gripper claws 16, are fastened to a common gripper slide 13, which can be tracked along a gripper guide 18 in the feed direction 10.

In this case, both the feed of the gripper slide 13 and of the feed conveyor 4 can be driven in a controlled manner, wherein, however, the actual feed speed of the logs K is effected by so-called upper and lower product guides 8, 9 which are also driven in a controlled manner and which engage the upper side and lower side of the logs K to be sliced in their front end areas near the slicing unit 7:

The front ends of the logs K are each extended through a product opening 6*a-d* of a plate-shaped slicing frame 5, wherein the slicing plane 3", in which the blade 3 rotates with its slicing edge 3*a* and thus cuts off the protrusion of the logs K from the slicing frame 5 as slice S, extends directly in front of the front, downwardly inclined end face of the slicing frame 5. The slicing plane 3" extends perpendicularly to the upper run of the feed conveyor 4 and/or is spanned by the two transverse directions 11, 12 to the feed direction 10.

In this case, the inner circumference of the product openings 6*a-d* serves as a counter slicing edge of the slicing edge 3*a* of the blade 3.

Since both product guides 8, 9 can be driven in a controlled manner, particularly independently of one another and/or possibly separately for each track SP1 to SP4, these determine the (continuous or clocked) feed speed of the logs K through the slicing frame 5.

The upper product guide 8 is displaceable in the second transverse direction 12 (which extends perpendicularly to the surface of the upper run of the feed conveyor 4) to adapt to the height H of the log K in this direction. Further, at least one of the product guides 8, 9 can be designed to pivot about one of its deflection rollers in order to be able to change the direction of the strand of its guide belt resting against the log K to a limited extent.

The slices S, which are at an angle in the space when they are separated, fall onto a discharge device 17, which starts below the slicing frame 5 and extends in the direction of travel 10* and in this case consists of multiple discharge units 17*a, b, c* arranged one behind the other with their upper runs of their conveyor belts approximately aligned in the direction of travel 10*, of which the first discharge unit 17*a* in the direction of travel 10 can be designed as a portioning belt unit 17*a* and/or can also be designed as a weighing unit.

The slices S can hit the portioning belt unit 17*a* individually and be spaced apart from one another in the direction of travel 10* or, by appropriate control of the portioning belt 17*a* of the discharge device 17 (whose movement, like almost all moving parts, is controlled by the controller 1*) form shingled or stacked portions P by mostly stepwise forward movement or backward movement of the portioning belt 17*a*. In that regard, as one skilled in the art would understand, the controller 1*, as well an any other unit, machine, apparatus, element, sensor, device, component, system, subsystem, arrangement, or the like described herein may individually, collectively, or in any combination comprise appropriate circuitry, such as one or more appropriately programmed processors (e.g. one or more microprocessors including central processing units (CPU)) and associated memory, which may include stored operating system software and/or application software executable by the processor(s) for controlling operation thereof and/or for performing the particular algorithms represented by the various functions and/or operations described herein, including interaction and/or cooperation between any such controller, unit, machine, apparatus, element, sensor, device, component, system, subsystem, arrangement, or the like. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Below the feed conveyor unit 20 there is usually an approximately horizontally extending residue conveyor 21, which starts with its front end below the slicing frame 5 and directly below or behind the discharge unit 17 and with its upper run thereon (by means of the drive of one of the discharge conveyors 17 against the direction of travel 10) transports away falling residues to the rear.

It has to be distinguished whether the portioning belts 17*a* can be controlled separately and independently of one another, i.e. with regard to the movement of the circulating conveyor belt, or all existing portioning belts 17*a* have a common drive and can only be driven together and synchronously, which has the same effect as a continuous wide portioning belt 17*a* across all lanes SP1 to SP4 of the machine 1 in the transverse direction 11.

Figure 3A:
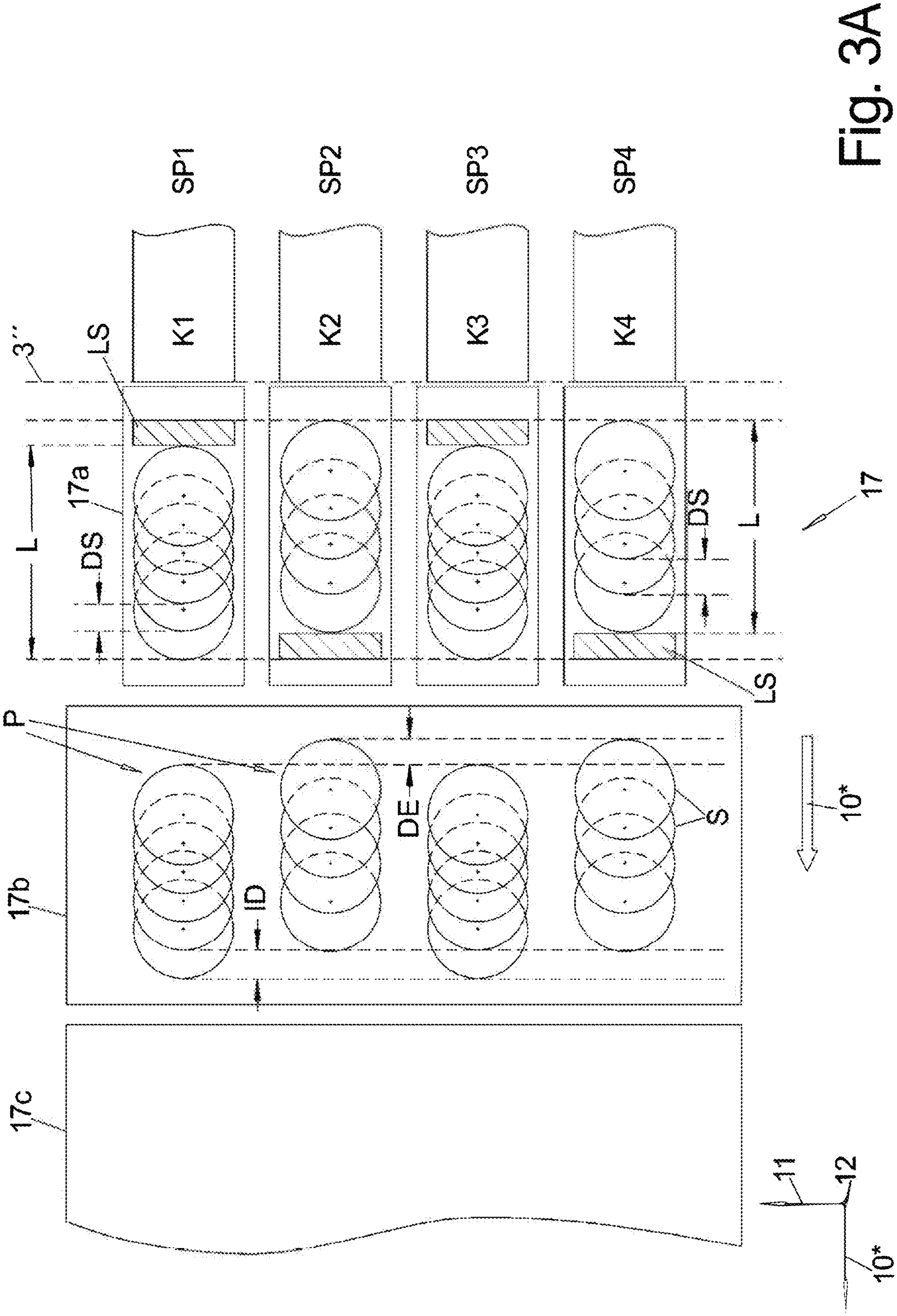
FIGS. 3A-C: show situations on the discharge unit in the case of portioning belts controllable separately and independently of one another in plan view.
Figure 3B:
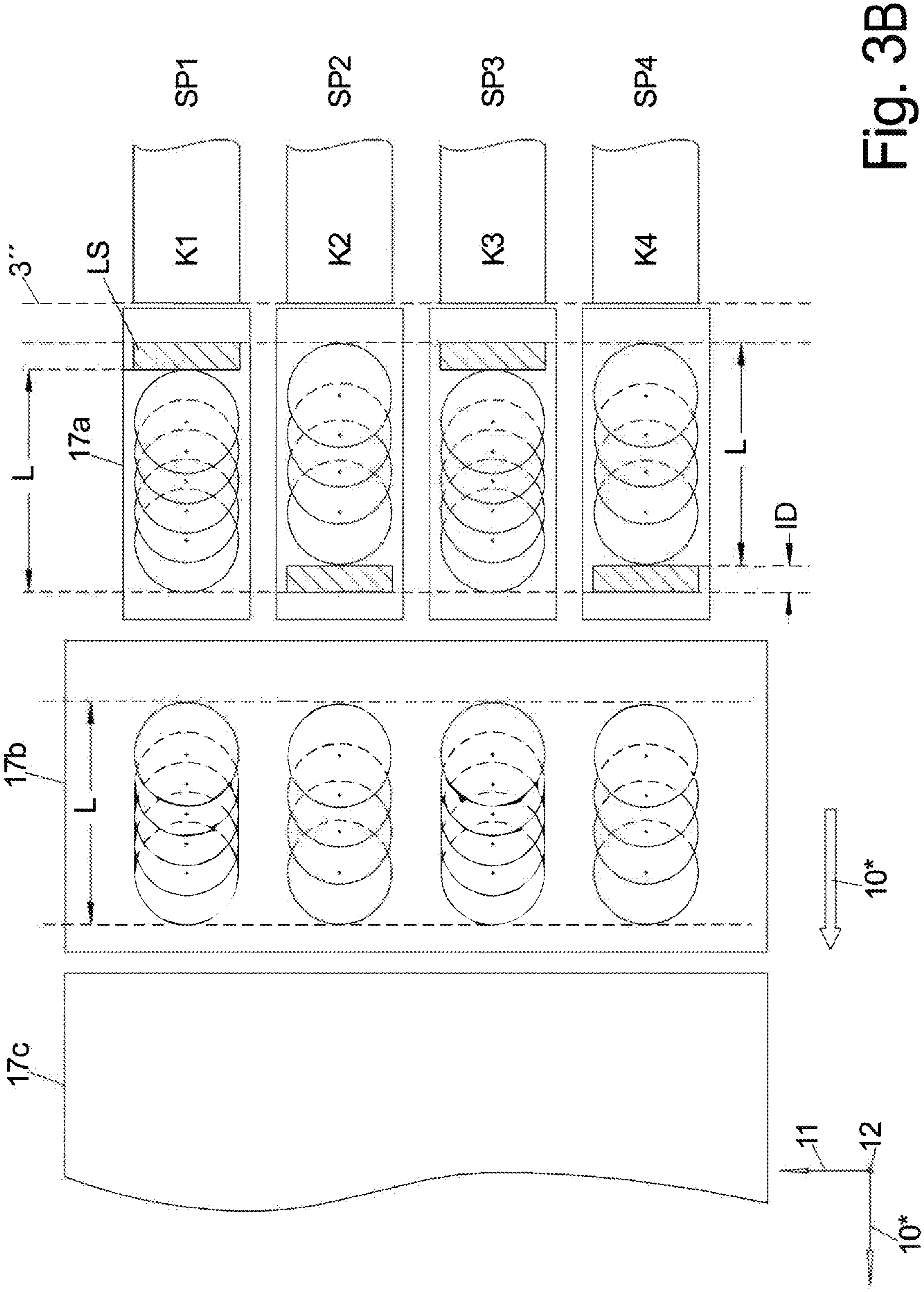
Figure 3C:
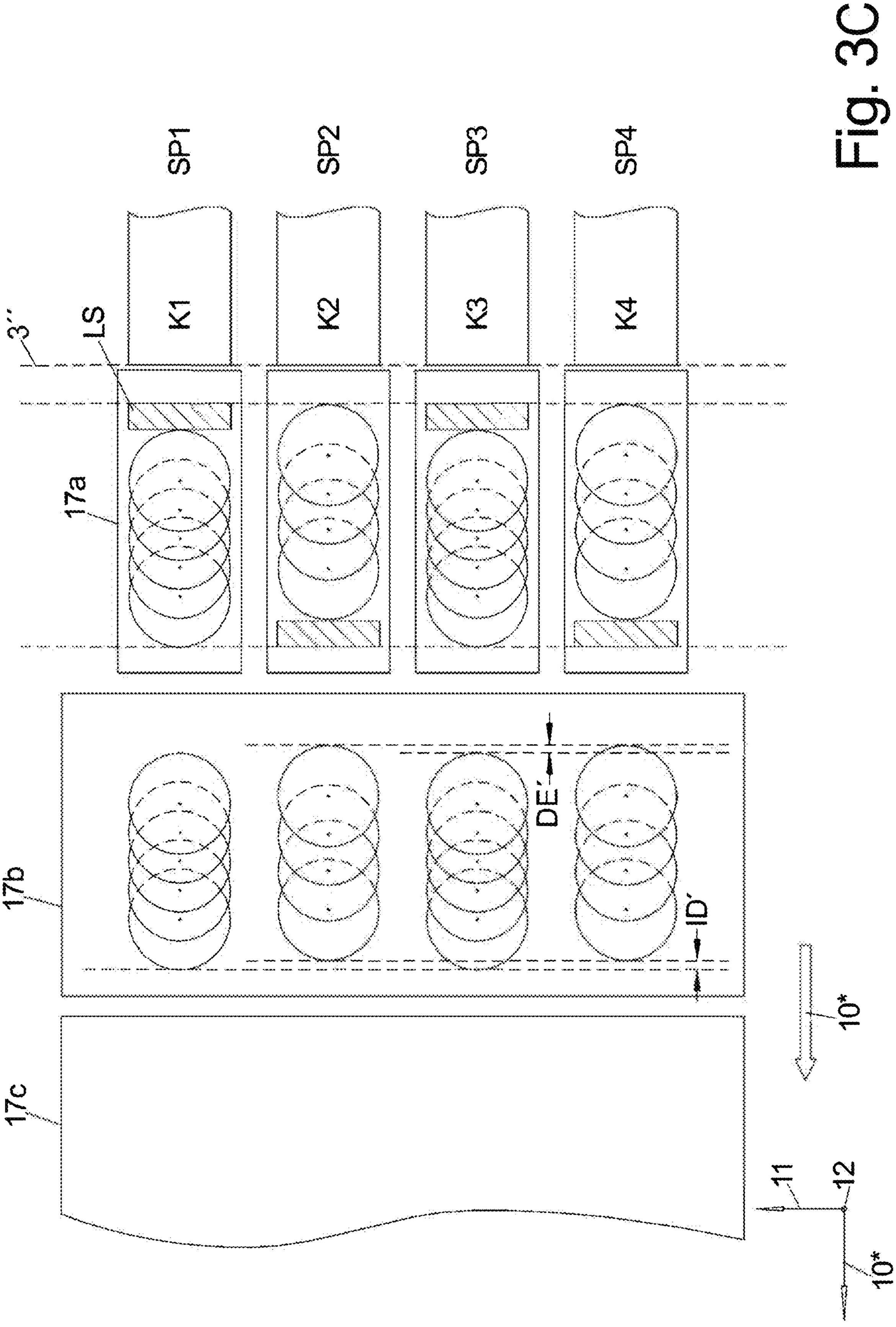

FIGS. 3A-C show a discharge unit 17 of a slicer 1 with portioning belts 17*a* which can be controlled independently of one another, i.e. per lane one portioning belt 17 *a*.

In this case, on the lanes SP1 and SP3—the logs K1 and K3 on these lanes are preferably of the same type, i.e. in particular have the same cross-section (apart from production inaccuracies) and/or consist of the same food-portions having five slices each are created, whereas portions with four slices S each are created on the lanes SP2 and SP4. Nevertheless, the length L of the portions P is the same on all lanes SP1 to SP4, which is achieved in that, in the small portions (i.e. the portions with a smaller number of slices) on the lanes SP2 and SP4, the slice distance DS is selected to be correspondingly larger than in the large portions on the lanes SP1, SP3.

Here, in the lanes SP2 and SP4, an unproductive cut LS is carried out when the first slices are cut on the two other lanes SP1 and SP3 (represented symbolically by a hatched rectangle) and after the first cut, all portioning belts 17*a* are moved forwards by one slice distance DS of the respective portioning belt 17*a*.

In this way, portions P having the same length L are formed on each of the portioning belts 17*a*, although the front end of the small portions is set back in the direction of travel 10* by an initial distance ID compared to the front ends of the large portions.

In this constellation, according to FIG. 3A all four portions are synchronously transferred to the transfer belt 17*b* (which is typically a conveyor belt that is continuous over the entire width in the transverse direction 11) so that the corresponding initial distance ID is also present there and, conversely, analogously, a corresponding end distance DE, by which the rear end of the small portions on the lanes SP2 and SP4 is set back compared the rear ends of the large portions on the lanes SP1 and SP3.

According to FIG. 3B (depending on the corresponding work order) these starting and final distances ID, DE can naturally be compensated for by the initial distance ID during the transfer from the portioning belts 17$a$ to the transfer belt 17$b$ by faster running or earlier starting of those portioning belts 17$a$ on which the front ends of the portion P is set back in relation to the other portions P by the initial distance ID so that the portions P (which are equally long in any case) are then located at the same longitudinal position in the direction of travel 10* on the transfer belt 17$b$ both with their front and their rear ends.

Figure 5A:
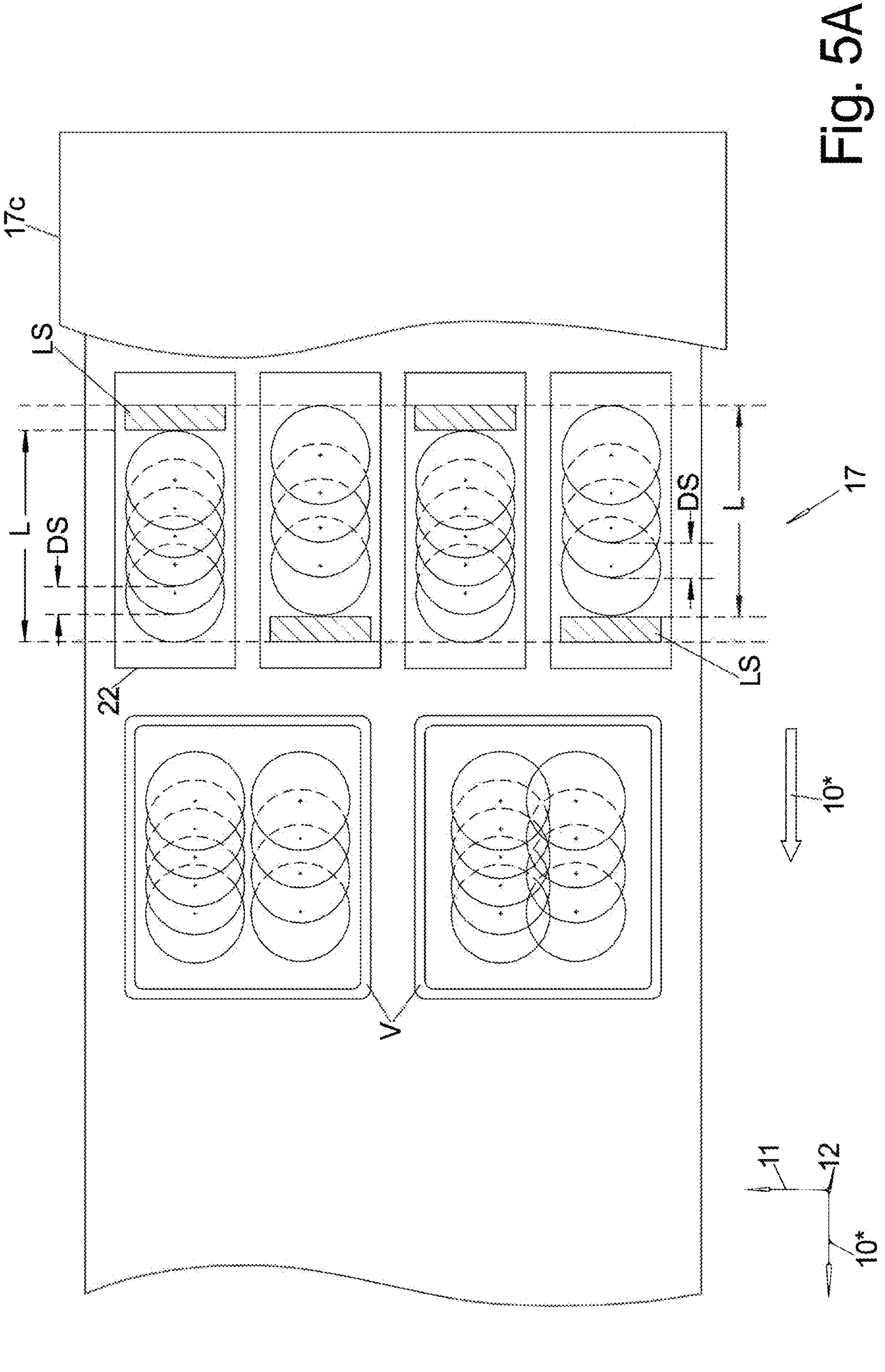
FIGS. 5A-C: show situations in the plan view from above when multiple portions are combined next to one another in a packaging.
Figure 5B:
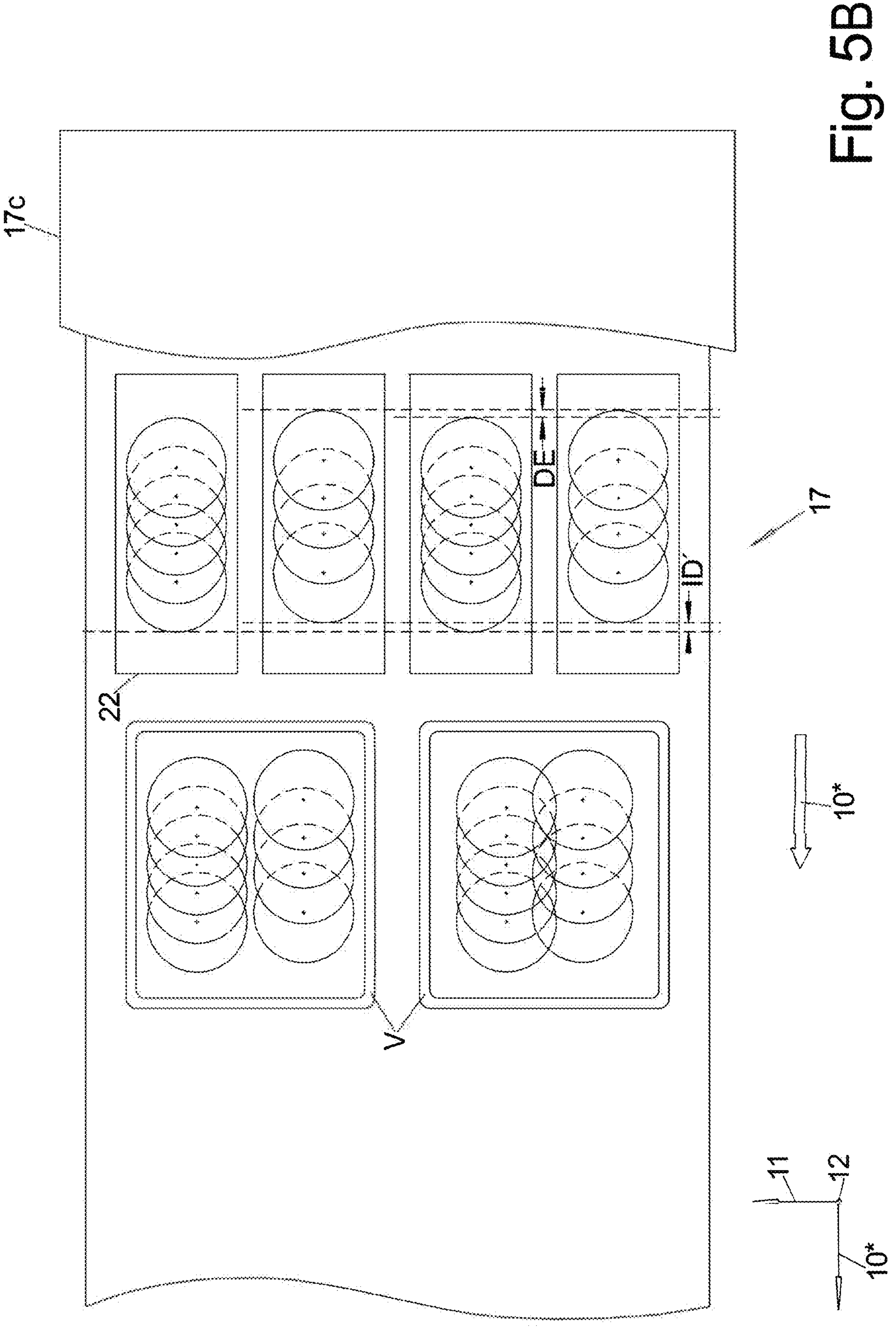
Figure 5C:
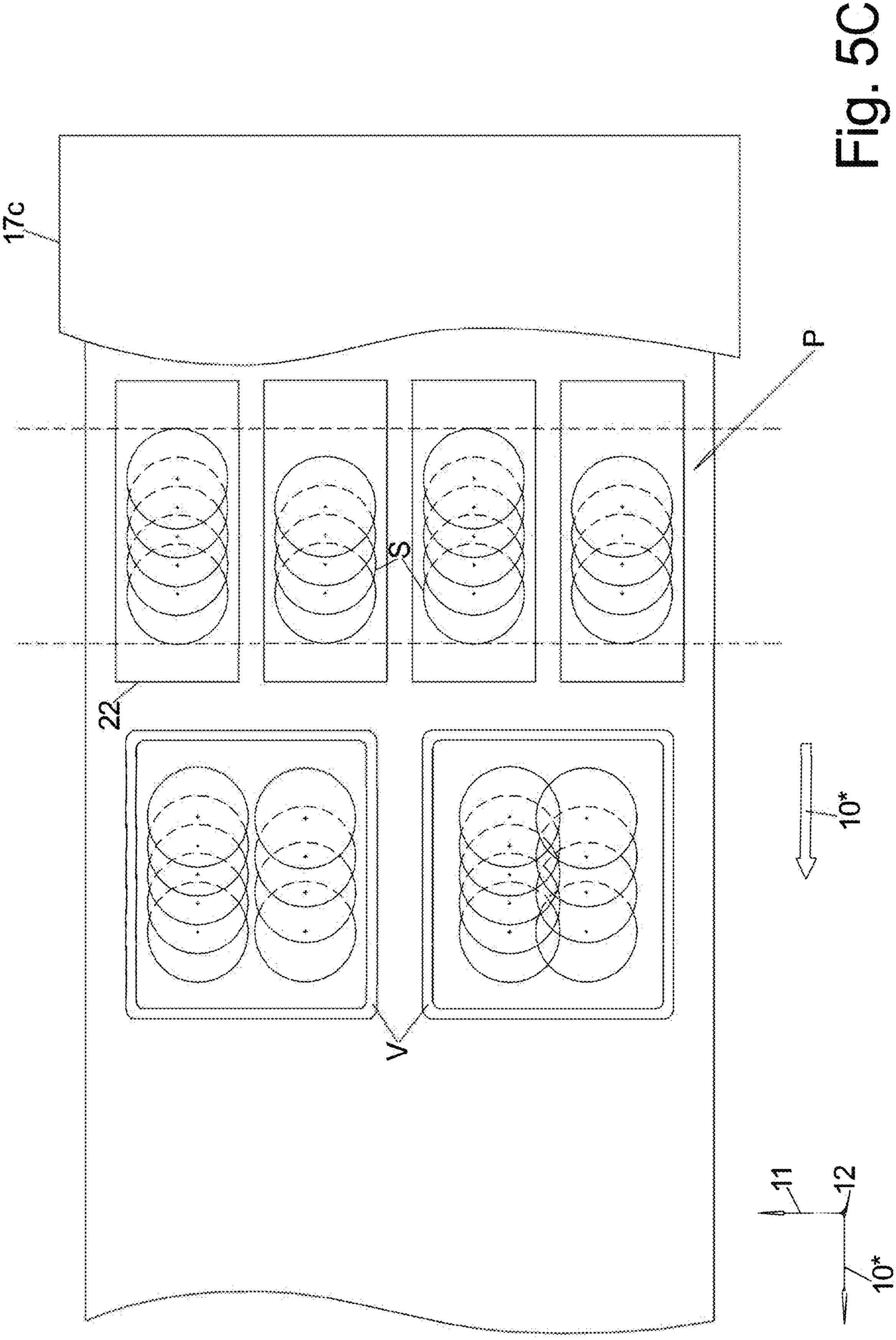

However, according to FIG. 3C, it can also be desirable that a deliberately (but usually then smaller than the original) initial distance ID' is produced between the small and the large portions P in order to thereby achieve a certain visual appearance, for example if, according to FIGS. 5A-C, portions P which are not the same are then to be deposited together with a packaging.

Figure 4A:
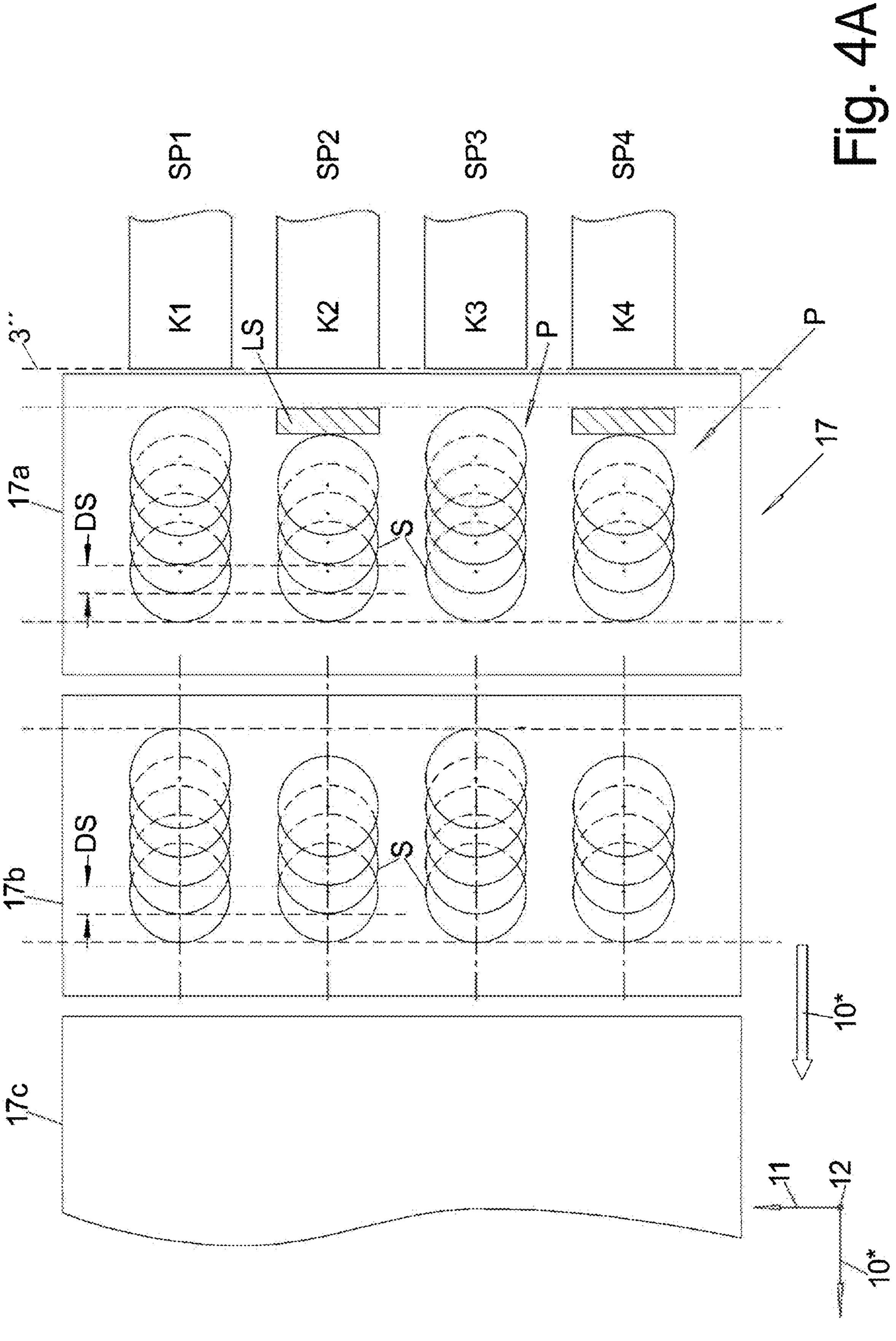
FIGS. 4A, B: show situations on the discharge unit in the case of portioning belts which are not controllable independently from one another, here shown in the form of a single continuous wide portioning belt across all lanes, in plan view.

FIGS. 4A, B, in contrast, show a discharge unit 17 in which the portioning belts per lane SP1 to SP4 cannot be controlled independently of one another, but in this case even only one portioning belt 17$a$ is present and passes through all lanes SP1 to SP4 in the transverse direction 11.

Here also (as in FIGS. 3A-C) portions having five slices are produced on the lanes SP1 and SP3 and portions having only four slices are produced on the lanes SP2 and SP4, but, independently thereof, the slice distances DS within the portions P are necessarily of equal length in all portions P, i.e. on all lanes SP1-SP4, so that different portion lengths L result.

In this case, in FIG. 4A in the first four cuts, a slice S is separated from each log K1 to K4 and in the last cut only from the logs K1 and K3, the portions P of which are to comprise one slice S more.

Thus, in the case of the lanes SP2 and SP4, an unproductive cut LS took place in the last cut in that the logs K2 and K4 there did not project over the slicing plane 3" during the last cut.

Accordingly, the portions P start on all lanes SP1 to SP4 at the same longitudinal position on the portioning belt 17$a$.

Due to the lack of a possibility to change the lanes individually, after transfer of these portions P produced simultaneously next to one another, the four portions, after transfer to the transfer belt 17$b$, are likewise located there in the same constellation, i.e. longitudinal position, relative to one another, as previously on the portioning belt 17$a$.

Figure 4B:
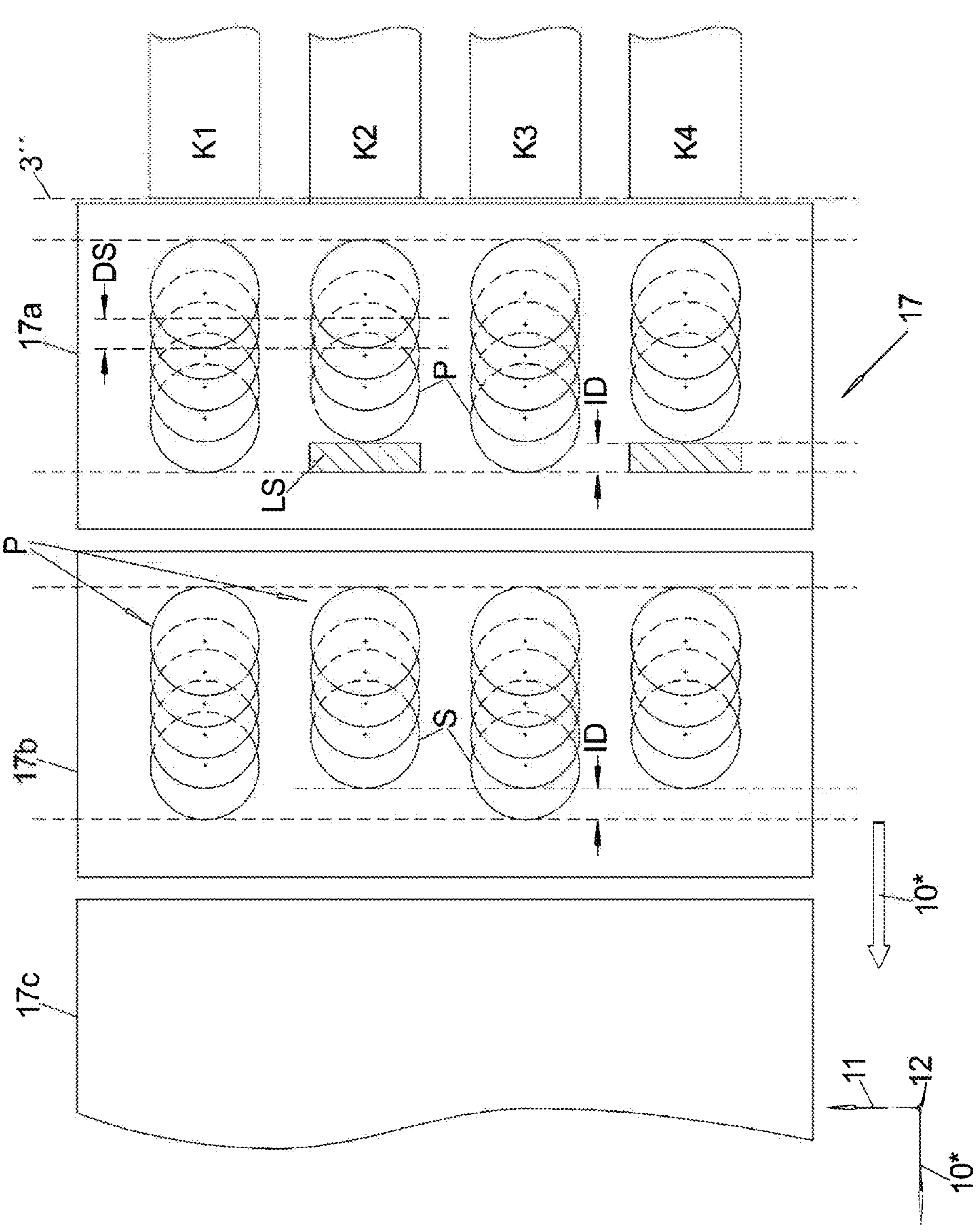

FIG. 4B, in contrast, shows the situation that, in the case of the small portions to be produced, i.e. on the lanes SP2 and SP4, an unproductive cut LS was carried out in the first cut for the portions P to be produced in parallel and thus the front end of the portions on the lanes SP2 and SP4 is set back by a slice distance DS (which in this constellation is the same within all portions) with respect to the front end of the large portions P on the lanes SP1 and SP3.

Here too, due to the lack of a possibility to change the lanes individually, the portions produced simultaneously next to each other in the transverse direction 11 are located, after transfer to the transfer belt 17$b$, in the same constellation there with regard to the longitudinal position in the direction of travel 10*.

FIGS. 5A-C show the combining of two portions P produced next to one another together in a packaging V, here a packaging trough of a deep-drawing belt into which they are inserted by an inserter 22.

If the inserter 22 or a belt unit located between the discharge unit 17 and the inserter 22 consists of adjacent conveyor belts which can be driven separately and independently of one another (here the inserter 22 itself) the longitudinal positions of the portions P combined in a packaging V can still be varied before or during introduction into the packaging V with regard to their mutual longitudinal position.

As a result, the longitudinal positions of the portions in the packaging V can also be changed in the case of a portioning belt 17$a$ made of portioning belts 17$a$ which cannot be controlled independently of one another, but of course the slice distances DS between the slices S in one portion and/or thus also the portion lengths L can no longer be changed.

FIG. 5A shows the situation that the portion beginnings of the portions previously located next to one another in the discharge unit 17 having both an initial distance ID and an end distance DE are brought to the same longitudinal position and, due to the same portion length L, the portion ends also lie at the same longitudinal position in the packaging V, regardless of whether the portions P in the packaging V are deposited next to one another at a distance or are deposited overlapping in the transverse direction 11, which are both shown alternatively in FIG. 5A.

FIG. 5B shows, in contrast, the situation that the portions having an initial distance and an end distance, which was already reduced on the inserter 22 compared to the original initial and final distance because it is desired according to visual specifications, is then left as is when being transferred to the packaging V.

FIG. 5C shows the situation that the portions having an unequal length, as can be exclusively produced with a portion belt 17$a$ that can only be controlled uniformly in the case of a different number of slices and which either have an initial distance ID or an end distance DE between portions of unequal size, are offset relative to one another in the longitudinal direction when being inserted, instead of only by an initial distance or only an end distance, in such a way that they have both an initial distance ID and an end distance DE, but this is smaller than the originally present only initial distance ID or only final distance DE, generally in each case half thereof.

LIST OF REFERENCE NUMBERS

- 1 Slicing machine, slicer
- 1* Controller
- 2 Base frame
- 3 Blade
- 3 Axis of rotation
- 3" Blade plane, slicing plane
- 3$a$ Slicing edge
- 4 Feed conveyor, feed belt
- 5 Slicing frame
- 6$a$-$d$ Product opening
- 7 Slicing unit
- 8 Upper product guide, upper guide belt
- 8.1 Contact run, lower run
- 8$a$ Blade-side deflection roller
- 8$b$ Deflection roller facing away from the blade
- 9 Lower product guide, lower guide belt
- 8.1 Contact run, upper run
- 9$a$ Blade-side deflection roller
- 9$b$ Deflection roller facing away from the blade
- 10 Transport direction, feed direction,
- 10* Direction of travel through machine, longitudinal direction of machine
- 11 1st Transverse direction (width slicer)
- 12 2nd Transverse direction (height-direction of log)
- 13 Gripper unit, gripper slide
- 14, 14 $a$-$d$ Gripper

15 Spacer
15' Support surface
16 Gripper claw
17 Discharge unit
17*a, b, c* Portioning belt, discharge conveyor
18 Gripper guide
19 Height sensor
20 Feeding unit
21 Residual piece conveyor
22 Inserter
DS Slice distance
ID Initial distance
DE End distance
K Product, product log
KR Log remainder, remaining piece
L Length of portion
LS Unproductive cut
S Slice
P Portion
V Packaging element, packaging

What is claimed is:

1. A method for parallel, substantially simultaneous production of shingled portions with different numbers of slices by use of a multi-lane slicing machine for product logs with a rotating blade and portioning belts that can be controlled individually for each lane downstream of the blade, the method comprising:

during slicing of a portion, separating by the blade a slice from each of the logs supplied in parallel during at least one revolution of the blade; and controlling the portioning belts such that a length of each of the portions produced in parallel next to one another is approximately the same independent of number of slices in each of the portions;

wherein no slice is separated from at least one log during a first cut for a portion.

2. The method according to claim 1, wherein a slice distance of adjacent slices within the portions is selected such that the portion length is the same in all portions independently of the number of slices.

3. The method according to claim 1, wherein one slice is separated from each log during each cut between a first cut and a last cut.

4. The method according to claim 1, wherein the at least one log from which no slice is separated during the first cut for a portion comprises multiple logs that are selected of a same type.

5. The method according to claim 4, wherein the multiple logs have a same consistency.

6. The method according to claim 1, wherein no slice is separated from multiple logs during a last cut for a portion, and the multiple logs are selected of a same type.

7. The method according to claim 6, wherein the multiple logs have a same consistency.

8. The method according to claim 1, a slice distance is selected to be equal within all parallel portions.

9. The method according to claim 1, wherein no slice is separated from at least one log in a last cut for a portion.

10. The method according to claim 1, wherein multiple portions of the portions produced next to one another are subsequently introduced together into a packaging, spaced apart or partially overlapping in a transverse direction, and wherein before or during combining, front ends and/or rear ends of the multiple portions are brought to a same longitudinal position in the packaging.

11. The method according to claim 10, wherein after a penultimate cut for the multiple portions produced next to one another, only the portioning belts of those lanes on which a last slice still has to be deposited for this portion are moved forwards.

12. The method according to claim 1, wherein multiple portions of the portions produced simultaneously next to one another are then introduced together into a packaging, spaced apart or partially overlapping in a transverse direction, and wherein before or during combining, the multiple portions are left in their relative position relative to one another in a longitudinal direction.

13. The method according to claim 1, wherein multiple portions of the portions produced next to one another are subsequently introduced together into a packaging, at a distance or partially overlapping in a transverse direction, and wherein before or during combining, the multiple portions are brought to a smaller initial distance and/or end distance from one another in a longitudinal direction than was present on the portioning belts.

14. A multi-lane slicing machine for slicing product logs into slices and producing shingled or stacked portions from slices, the slicing machine comprising:

a slicing unit having a blade;

a feeding unit for feeding multiple logs to the slicing unit;

a discharge unit having at least one portioning belt; and a controller configured to control the slicing unit and the feeding unit such that during slicing of a portion, the blade separates a slice from each of the logs supplied in parallel during at least one revolution of the blade, and to control the at least one portioning belt such that a length of each of the portions produced in parallel next to one another is approximately the same independent of number of slices in each of the portions, and wherein the controller is configured to control the slicing machine such that no slice is separated from at least one log during a first cut for a portion.

15. The slicing machine according to claim 14, wherein the at least one portioning belt comprises a portioning belt in each lane and the portioning belts are controllable independently of one another.

* * * * *